（12） United States Patent
Smith et al.

(10) Patent No.: US 8,586,218 B1
(45) Date of Patent: Nov. 19, 2013

US008586218B1

(54) PROCESS FOR RECYCLING ALKALINE BATTERIES

(75) Inventors: W. Novis Smith, Philadelphia, PA (US); Michael Arutunian, Havertown, PA (US); Scott Swoffer, Folcroft, PA (US)

(73) Assignee: Toxco, Inc., Anaheim, CA (US)

( * ) Notice: Subject to any disclaimer, the term of this patent is extended or adjusted under 35 U.S.C. 154(b) by 93 days.

(21) Appl. No.: 13/373,604

(22) Filed: Nov. 21, 2011

(51) Int. Cl.
*H01M 6/52* (2006.01)
*H01M 10/54* (2006.01)

(52) U.S. Cl.
USPC .......................................... 429/49

(58) Field of Classification Search
None
See application file for complete search history.

(56) References Cited

U.S. PATENT DOCUMENTS 4,401,463 A * 8/1983 Melin et al. ...................... 75/433
5,352,270 A * 10/1994 Shackle ........................... 75/419

* cited by examiner

*Primary Examiner* — Barbara Gilliam
*Assistant Examiner* — Adam A Arciero
(74) *Attorney, Agent, or Firm* — RatnerPrestia

(57) ABSTRACT

The present invention relates to a process for recycling alkaline batteries to recover metals and zinc and manganese compounds. The process provides for the separation of metal pieces and the chemical separation and recovery of zinc and manganese compounds.

12 Claims, No Drawings

PROCESS FOR RECYCLING ALKALINE BATTERIES

FIELD OF THE INVENTION

The present invention relates to a process for the recovery of zinc compounds, manganese oxide and metal from waste alkaline batteries. Accordingly, the batteries are crushed with water and the casing metal particles separated. Zinc compounds are then separated from manganese compounds by chemical separation steps. The zinc and manganese compounds form an aqueous slurry along with an electrolyte.

BACKGROUND OF THE INVENTION

About 85% of all batteries used commercially are alkaline batteries (dry cell batteries). These are currently essentially all land filled because current potential recycling processes for these batteries have high energy cost, capital costs, and processing costs which do not allow for sufficient economic incentive for the recovery of the valuable components of these batteries. These batteries contain about 26-65% steel as the casing, 4-10% alkaline electrolyte, 20-35% mixed manganese oxides, 20-35% zinc hydroxide/oxide and some carbon. The size of the battery or ratio of casing to contrast determines the relative amount of steel casing to the zinc and manganese content. If these batteries are to be economically viable to be recycled, the zinc oxide and the manganese oxides would have to be readily and efficiently isolated separately in high purity (>95%) and yield to maximize their value. In addition the steel casings would also need to be isolated free of these other components for efficient recycle as scrap steel for steel production. There have been a number of processes described for processing and recycling these batteries. These processes range from pyro metallurgical ones in which the iron and manganese are recovered in an alloy and the zinc might be partially recovered as impure in the flue dust and requires much further processing by hydrometallurgical steps which require the total solution of the zinc and then extensive chemical separation steps. There are some processes which attempt selective solution of the zinc and in the presence of considerable amount of the steel casing which in a mixed solution of manganese, iron and zinc now have to be separated with high purity requiring many processing steps and high energy.

SUMMARY OF THE INVENTION

The present invention provides a process for the recycling of alkaline batteries and the like to separate the casings metal from the zinc and manganese compounds which form an aqueous slurry along with the electrolyte.

Accordingly, the process comprises the steps of;
1) Washing crushed or hammer milled alkaline batteries;
2) Screening the products of step 1) and recovering the slurry;
3) Treating the slurry from step 2) with an acid selected from the group consisting of sulfuric acid, nitric acid or a mixture thereof to form a soluble zinc sulfate or nitrate;
4) Filtering the product of step 3) and washing the filter cake to obtain manganese oxides;
5) Neutralizing the filtrate from step 4) to pH 4-5 and oxidizing the filtrate to precipitate any manganese and iron present, and then
6) Filtering the product from step 5) and treating the filtrate with a member of the group selected from an alkaline carbonate and ammonium carbonate to pH 8-10 to precipitate zinc hydroxycarbonate, and
7) Optionally drying the zinc hydroxycarbonate to obtain zinc carbonate or optionally roasting the zinc hydroxycarbonate to obtain zinc oxide.

Optionally, the filtrate from step 4) is treated with an oxidizing agent to oxidize any divalent manganese to manganese dioxide.

It is a general object of the invention to recycle alkaline batteries in order to recover metal particles and zinc and manganese compounds.

It is another object of the invention to recover manganese oxides in high purity and to recover metal particles from waste alkaline batteries without the need to dissolve the metal casings of the alkaline batteries.

It is a yet further object of the invention to convert any zinc compounds in the batteries to zinc hydroxycarbonate.

DESCRIPTION OF THE PREFERRED EMBODIMENTS

There has been discovered a minimum cost process requiring low investment, minimum energy requirement, and processing steps and achieve the maximum purity for the isolated manganese oxides, zinc carbonate or oxide and the steel in high yield and purity. This new process has the lowest overall processing costs including minimum steps, process chemicals, highest yields, highest value products of any alkaline battery recycling process. The overall effect is that minimizing processing costs and obtaining the highest value for the recovered manganese oxides, zinc oxide, and steel, this process achieves good economic viability and incentive for recycling alkaline batteries. With this process the recovery of alkaline and related dry cells has sufficient economic incentive to significantly increase the recycling of these batteries. This process eliminates the need to dissolve the steel casing and the reduction and solution of the manganese oxides. This eliminate significant energy and eliminates many processing steps.

According to the invention there is the recovery of high purity manganese oxides, zinc compounds and casing metals (steel) from waste alkaline batteries. The process comprises the steps of:
a) Wet crushing or hammer milling alkaline or related batteries with an aqueous stream to form a slurry containing coarse metal casing parts and fine manganese and zinc compound particles;
b) Screening the coarse metal casing parts from step a) and recovering the screened coarser metal parts along with a separate slurry;
c) Filtering the slurry of b) and neutralizing the filtrate for disposal;
d) Treating the filter cake from c) with sulfuric acid, (or nitric acid, or a mixture of the two acids) to dissolve the zinc compounds including the oxide, hydroxide, and the zinc manganese oxide complexes to form a solution of the zinc sulfate or nitrate;
e) Filtering the slurry from d) and washing and recovering the manganese oxide filter cake as a high purity manganese oxide;
f) Neutralizing the zinc sulfate or nitrate filtrate from e) to a pH of 3-5 and adding an oxidizing agent such as air, alkali persulfate, ammonium persulfate, peroxide or air/ $SO_2$ with stirring and heating to facilitate the oxidation of any soluble manganese to the insoluble manganese dioxide and to also insolubilize any traces of iron present to ferric hydroxide and filtering and recovering the manganese dioxide precipitate, and then g) Treating the filtrate from step f) with an alkali carbonate or ammonium carbonate to a pH of about 8-10 to precipitate zinc hydroxycarbonate, and recovering the zinc hydroxycarbonate by filtration.

Optionally, adding oxidizing agents such as nitric acid or alkali or ammonium persulfate compounds to the product of d) to oxidize the manganese oxides to manganese dioxide and insolubilize any divalent manganese present.

More particularly, the process consists of crushing the alkaline batteries through a hammer mill or related crusher with or without a mild water stream or even a recirculating stream. The crushing is restricted to generate less than 1" (prefer ½") diameter pieces of steel casing. These casing are dropped onto a coarse (⅜" preferred) rotating screen or shaker table with a water stream to wash the steel clean and which is ready for packaging for scrap steel recovery as is. The coarse screened slurry which is basic (pH 10) due to the presence of the battery electrolytes from this coarse screening is subsequently screened through −25 mesh to remove essentially all of the iron/steel particles from the casings. A further screening to be certain of iron particle removal can be done through −165 mesh which passes the fine slurry of the zinc hydroxide/oxide and the mixed manganese oxides with a small amount of carbon. In effect, this step removes and recovers essentially all of the steel by a simple physical process. It avoids the more costly total solution of the iron and/or manganese and then the required separation steps.

The resulting brown slurry can be filtered to recover a mud-like solid which is a mix of zinc hydroxide/oxide and manganese oxide compounds. The clear filtrate is neutralized with sulfuric acid solution to obtain potassium sulfate for recrystallization and recovery. The solid mud is reslurried and sulfuric acid is carefully added with heat to dissolve the zinc hydroxide/oxide and extract the zinc from the zinc manganites selectively from the insoluble manganese oxides. There is sometimes a small amount of manganese +2 (MnO) which will dissolve partially under these mild conditions of not oxidizing. The resulting slurry is then filtered and washed producing a cake which is >99% manganese oxides and ready for sale. It can be further processed to manganese sulfate solution for electrowinning by 1) roasting with carbon and then dissolving in sulfuric acid or 2) reacting with $SO_2$/air in sulfuric acid. These are known processing conditions. The carbon is left in the manganese since it will be roasted with additional carbon added when it is converted to soluble manganese sulfate.

The zinc sulfate solution is neutralized to pH 4-5 with sulfuric acid and treated with air or treated with a small amount of an oxidizing agent such as ammonium persulfate, air, or hydrogen peroxide to convert any soluble iron to ferric hydroxide and any soluble manganese present to an insoluble manganese oxide. This solution is filtered to remove the small amount of precipitate from the purified zinc sulfate solution. At this point, sodium or ammonium carbonate is added to raise the pH to about 8-10 to precipitate the zinc as a hydroxycarbonate which can be dried to the pure carbonate or roasted to pure zinc oxide. The overall recovery for the process is >90% for all recovered high purity components. Zinc hydroxide can also be precipitated using sodium hydroxide and isolated.

An alternative recovery process for the zinc and manganese is to take the recovered basic filtrate from the −165 mesh screening and allowing it to settle for 20-40 minutes and then decanting the light off-white suspension of zinc hydroxide off the already settled manganese oxides. In this process, this is a direct result of the wet hammer mill processing and the very slow settling of the zinc hydroxide to allow a physical separation from the manganese oxides. The decanted zinc hydroxide suspension is neutralized with sulfuric acid to pH 3-4, oxidized and polished filtered to remove sulfurized manganese oxide. The clear high purity zinc sulfate solution is then treated with an alkali carbonate, particularly sodium carbonate or ammonium carbonate to recover zinc hydroxy carbonate then to zinc carbonate. It can also be treated with an alkali hydroxide, preferably sodium hydroxide, to isolate zinc hydroxide. Under the strong base conditions of the suspension containing both the original KOH electrolyte and the suspension of the zinc hydroxide, no iron or manganese compounds are soluble. Only non-settling manganese oxide or iron particles are present. When the acidification of this solution is to pH 4, neither the iron nor the manganese oxides will dissolve and while the zinc goes into solution, the settled manganese oxides are washed several times and allowed to settle. The decantates are combined with the initial decants and processed with the zinc solution. The clean manganese oxide cake is extracted with sulfuric acid to remove the last traces of the zinc. This clean dried manganese cake is 99% pure with some carbon.

A preferred process for recovering zinc compounds from the waste alkaline batteries comprises the steps of:
1) treating hammer milled waste alkaline batteries with water to form a slurry and washing the metal pieces;
2) separating the metal pieces and separating the solids from the slurry;
3) treating the solids from the slurry with a sulfuric acid solution to dissolve any zinc compounds and filtering to recover the purified manganese oxide;
4) neutralizing the solution from step 3) to a pH of 3-5 with an alkali hydroxide and then treating the solution with an oxidizing agent;
5) filtering;
6) raising the pH of the filtrate of step 5) with an alkali carbonate to a pH of about 8-10 to precipitate zinc hydroxycarbonate, and then
7) recovering zinc hydroxycarbonate.

Alternatively, the zinc hydroxycarbonate can be dried to produce zinc carbonate or roasted to produce zinc oxide.

While the invention has been described in detail with reference to specific embodiments thereof, it will be apparent to one skilled in the art that various changes, alterations and modifications can be made without departing from the spirit and scope of the invention and its equivalents as defined in the appended claims.

EXAMPLE 1

A. A mixture of 25 kg alkaline battery dry cells was run through a hammer mill with a minimum of water spray. The slurry was screened through 25 mesh steel grating/screen to give a +25 mesh fraction which consisted of clean steel metal chip from the batter cell casings and suitable for direct steel metal recovery and recycling. This amounted to about 42% of the total dry cell battery weight as recovered steel. Further screening of the slurry through −165 mesh left another 18% of the steel which was +165 mesh for a total of about 60% of the dry cell battery weight as clean steel chip and powder ready for direct steel furnace recycling. (It contained an additional few percent of plastic pieces.) The basic −165 mesh slurry contained all of the m0069ed manganese oxides, a few percent carbon, and the zinc as the hydroxide, zinc oxide and zinc manganites and essentially no iron. At this point the slurry can be passed through a magnetic separator to remove any power steel/iron if present.

B. The slurry containing all of the zinc and manganese compounds (32% of the AA battery; 10.1 kg) was filtered to remove the dilute basic electrolyte solution. The filter cake containing all of the zinc and manganese components was then reslurried in four equal volumes of water and stirred while sulfuric acid added to bring the pH to about 1 consistently. The slurry was heated to 50-80° C. and stirred for 3 hours. The pH was checked periodically and just enough additional sulfuric acid added to maintain a pH of about 1. The slurry was filtered and washed to remove the soluble zinc sulfate solution along with a small amount of soluble divalent manganese sulfate. The washed and dried cake of manganese oxides contained less than 0.3% zinc and is suitable for direct recycle into an electrolytic manganese dioxide processing facility. The pH of the clear colorless filtrate was adjusted to pH of 4-5 with sodium hydroxide and 5% by weight sodium persulfate added and the solution heated to 90° C. with stirring for three hours to precipitate all of the manganese as manganese dioxide and any iron if present. The slurry was then filtered to recover the small amount of manganese dioxide for recycle. A concentrated sodium carbonate solution was added to the stirred clear zinc sulfate filtrate to precipitate the pure zinc carbonate. The sodium carbonate solution was added until the pH stabilizes at 8-10. The white slurry was filtered and washed and dried at 100° C. The yield of zinc carbonate was essentially quantitative and contained less than 0.3% manganese and was suitable for recovery as industrial quality.

EXAMPLE 2

A mixture of 2 kg alkaline battery dry cells was run through a hammer mill with a minimum of water spray. The slurry was screened through a 25 mesh grating and screen to give a +25 mesh fraction which consisted of clean steel metal chip from the battery cell casings and suitable for direct steel metal recovery and recycling. This amount to about 840 g (42% of the total dry cell battery weight) as recovered steel. Further screening of the slurry through −165 mesh left another 360 g (18% of the steel which was +165 mesh) for a total of about 1200 g (60% of the dry cell battery weight) as clean steel chip and powder ready for direct steel furnace recycling. The basic −165 mesh slurry contained all of the mixed manganese oxides, a few percent carbon, and the zinc as the hydroxide, zinc oxide and zinc manganites and essentially no iron.

The slurry containing all of the zinc and manganese compounds (32% of the AA battery; 640 g) was allowed to settle and the supernatant taken off after 24 hours leaving the damp wet cake ready for acid processing. Sufficient 10% nitric acid solution was added to the damp cake to make a thick paste. After 5 minutes sufficient 20% sulfuric acid was added until this slurry had a consistent pH 1. To this slurry was added 3 liters of water and the slurry heated to over 50° C. for two hours and filtered and the cake washed thoroughly to remove the soluble zinc compounds. After drying, the yield of manganese oxides was 350 g and contained <0.25% zinc. The XRD analysis on this material showed that it had been reoxidized and it was substantially manganese dioxide having more value than the mixed manganese oxides. The pH of the filtrate containing the zinc compounds with any divalent manganese present was adjusted to 4 with sodium hydroxide. The filtrate is then taken to 90° C. and 3% by weight of solution of ammonium persulfate added and the heating continued for three hours. The soluble manganese precipitated as manganese dioxide and the slurry was then filtered and the manganese dioxide filter cake washed, dried, and combined with the initially recovered manganese dioxide. The clear filtrate was stirred while a concentrated solution of sodium carbonate was added slowly to a pH of 9 to precipitate zinc carbonate. The white slurry was filtered and washed and dried at 100° C. The yield of zinc carbonate was essentially quantitative (300 g) and contained less than 0.5% manganese and was suitable for recovery as industrial quality.

EXAMPLE 3

A mixture of 2.2 kg alkaline battery dry cells was run through a hammer mill with a minimum of water spray. The slurry was screened through a 25 mesh grating and screen to give a +25 mesh fraction which consisted of clean steel metal chip from the battery cell casings and suitable for direct steel metal recovery and recycling. This amount to about 920 g (42% of the total dry cell battery weight) as recovered steel. Further screening of the slurry through −165 mesh left another 400 g (19% of the steel which was +165 mesh) for a total of about 1320 g (about 60% of the dry cell battery weight) as clean steel chip and powder ready for direct steel furnace recycling. The basic −165 mesh slurry contained all of the mixed manganese oxides, a few percent carbon, and the zinc as the hydroxide, zinc oxide and zinc manganites and essentially no iron.

The slurry containing all of the zinc and manganese compounds (32% of the AA battery; 700 g) was allowed to settle and the supernatant taken off after 12 hours leaving the damp wet cake ready for acid processing. Sufficient 25% sulfuric acid was added until this slurry had a consistent pH 1 and was stirrable. 100 g of 25% nitric acid solution was added to the slurry and stirred for 30 minutes. To this slurry was added 3 liters of water and the slurry heated to over 80° C. for two hours and filtered and the cake washed thoroughly to remove the soluble zinc compounds. After drying, the yield of manganese oxides was 390 g and contained <0.25% zinc. The XRD analysis on this material showed that it had been reoxidized and it was substantially manganese dioxide having more value than the mixed manganese oxides. The pH of the filtrate containing the zinc components with any divalent manganese present was adjusted to 4.5 with sodium hydroxide. The filtrate is then taken to 90° C. and 5% by weight of solution of sodium persulfate added and the heating continued for three hours. The soluble manganese precipitated as manganese dioxide and the slurry was then filtered and the manganese dioxide filter cake washed, dried, and combined with the initially recovered manganese dioxide. The clear filtrate was stirred while a concentrated solution of sodium carbonate was added slowly to a pH of 9 to precipitate zinc carbonate. The white slurry was filtered and washed and dried at 100° C. The yield of zinc carbonate was essentially quantitative (320 g) and contained less than 0.5% manganese and was suitable for recovery as industrial quality.

EXAMPLE 4

A mixture of 1.5 kg alkaline battery dry cells (predominantly AA cells) was run through a hammer mill with a minimum of water spray. The slurry was screened through a 25 mesh grating and screen to give a +25 mesh fraction which consisted of clean steel metal chip from the battery cell casings and suitable for direct steel metal recovery and recycling. This amounted to about 600 g (40% of the total dry cell battery weight) as recovered steel. Further screening of the slurry through −165 mesh left another 300 g recovered steel.

Further screening of the slurry through −165 mesh left another 300 g (20% of the steel which was +165 mesh) for a total of about 900 g (about 60% of the dry cell battery weight) as clean steel chip and powder ready for direct steel furnace recycling. The basic −165 mesh flurry contained all of the mixed manganese oxides, a few percent carbon, and the zinc as the hydroxide, zinc oxide and zinc manganites and essentially no iron.

The slurry containing all of the zinc and manganese compounds (32% of the AA battery; 480 g) was filtered leaving the damp wet cake ready for acid processing. Sufficient 25% sulfuric acid was added until this slurry had a consistent pH 1 and was stirrable. To this slurry was added 3 liters of water and 100 g sodium persulfate and the slurry heated and stirred to over 80° C. for two hours and filtered and the cake washed thoroughly to remove the soluble zinc compounds. After drying, the yield of manganese oxides was 390 g and contained <0.25% zinc. The XRD analysis on this material showed that it had been reoxidized and it was substantially manganese dioxide having more value than the mixed manganese oxides. The pH of the filtrate containing the zinc components with any divalent manganese present was adjusted to 4.5 with sodium hydroxide. The filtrate is then taken to 90° C. and 5% by weight of solution of sodium persulfate added and the heating continued for three hours. Only a trace of manganese precipitated as manganese dioxide and the slurry was then filtered and the manganese dioxide filter cake washed, dried, and combined with the initially recovered manganese dioxide. The clear filtrate was stirred while a concentrated solution of sodium carbonate was added slowly to a pH of 9 to precipitate zinc carbonate. The white slurry was filtered and washed and dried at 100° C. The yield of zinc carbonate was essentially quantitative (250 g) and contained less than 0.5% manganese and was suitable for recovery as industrial quality.

What is claimed is:

1. A process for the recovery of high purity manganese oxides, zinc compounds and steel from alkaline batteries which comprises the steps of;
    a) washing crushed alkaline batteries with an aqueous stream to form a slurry and steel particles;
    b) screening the steel particles from step a);
    c) separating the resultant slurry from step b);
    d) treating the solids from step c) with sulfuric acid to dissolve zinc hydroxide which is formed to provide a zinc sulfate solution and filtering and neutralizing;
    the zinc sulfate solution to a pH of 3-5 ;
    e) oxidizing the zinc sulfate solution of step d) with an oxidizing agent or air to convert any iron to ferric hydroxide and soluble manganese compound present to an insoluble manganese oxide;
    f) filtering to provide a filtrate;
    g) treating the filtrate from step f) with an alkali carbonate or ammonium carbonate to a pH of about 8 to precipitate zinc hydroxyl carbonate, and
    h) recovering zinc hydroxycarbonate.

2. The process of claim 1 wherein the zinc hydroxycarbonate is dried to produce zinc carbonate.

3. The process of claim 1 wherein the zinc hydroxycarbonate is roasted to produce zinc oxide.

4. The process of claim 1 wherein the crushed batteries have been hammer milled.

5. The process of claim 4 wherein the hammer milled particles are less than one inch.

6. The process of claim 1 wherein the oxidizing agent of step e) is selected from the group consisting of ammonium persulfate; alkali persulfates; hydrogen peroxide; air; and $SO_2/O_2$.

7. The process of claim 1 wherein in step g) the filtrate from step f) is treated with an alkali hydroxide to form zinc hydroxide.

8. The process of claim 1 wherein the aqueous stream of step a) comprises steam.

9. A process to recover hammer milled zinc compounds from water treated crushed alkaline batteries which comprises the steps of:
    A) separating steel particles from the slurry formed with water;
    B) separating the solids from the slurry after removal of the steel particles in step A);
    C) treating the solids from step B) with a sulfuric acid solution to dissolve zinc compound present in the solids and recovering insoluble manganese oxide present in the solids;
    D) neutralizing the solution of step B) to a pH of 3-5 with an alkali hydroxide and then treating with an oxidizing agent to convert soluble iron compounds to ferric hydroxide and any soluble manganese compounds to insoluable manganese oxide;
    E) filtering the neutralized, treated solution from step D) to obtain a filtrate;
    F) raising the pH of the filtrate from step E) with an alkali carbonate to a pH of about 8-10 to precipitate zinc hydroxycarbonate, and then
    G) recovering said zinc hydroxycarbonate.

10. The process of claim 9 comprising a further step of roasting the zinc hydroxycarbonate of step G) to form zinc oxide.

11. The process of claim 9 wherein the steel particles of step A) are screened.

12. The process of claim 9 wherein in step F) the filtrate from step E) is treated with sodium hydroxide to precipitate zinc hydroxide.

* * * * *